(No Model.)
W. C. NYE.
IMPLEMENT FOR MIXING AND WORKING MORTAR.
No. 324,336. Patented Aug. 11, 1885.
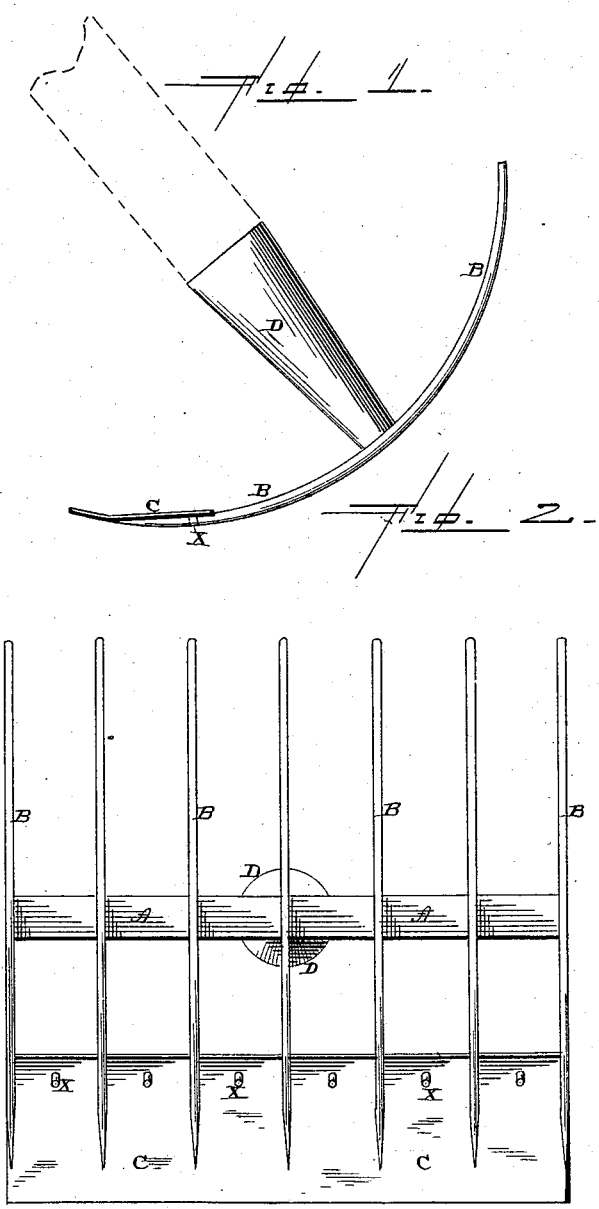
Witnesses.
X. F. Gardner
Jno. E. Prosseri
Inventor.
Wm. C. Nye
per J. A. Lehmann, Atty

UNITED STATES PATENT OFFICE.

WILLIAM C. NYE, OF BRADFORD, PENNSYLVANIA.

IMPLEMENT FOR MIXING AND WORKING MORTAR.

SPECIFICATION forming part of Letters Patent No. 324,336, dated August 11, 1885.

Application filed June 2, 1885. (No model.)

*To all whom it may concern:*

Be it known that I, WILLIAM C. NYE, of Bradford, in the county of McKean and State of Pennsylvania, have invented certain new and useful Improvements in Implements for Mixing and Working Mortar; and I do hereby declare the following to be a full, clear, and exact description of the invention, such as will enable others skilled in the art to which it pertains to make and use it, reference being had to the accompanying drawings, which form part of this specification.

My invention relates to an improvement in implements for mixing and working mortar; and it consists in, first, a combined hoe and rake in which the teeth preferably form a segment of a circle, and form ribs upon the outer side of the blade or hoe in such a manner as to break and grind the mortar while the implement is being used; second, the construction and arrangement of parts, which will be more fully described hereinafter.

The object of my invention is to provide a combined hoe and rake for making and working mortar for building purposes, and in which the teeth are formed upon a curve, so that when the implement is drawn through the mortar the mortar is forced toward the center of the implement, and when the implement is forced through the mortar the mortar is forced outward in opposite directions.

Figure 1 represents a side elevation of an implement embodying my invention. Fig. 2 is a front view of the same.

A represents the head; B, the teeth, and C the hoe or blade, all three of which parts may be cast or otherwise formed in a single piece. Secured to the inner side of the head, at its center, is the socket D, in which the handle is secured. This socket may be cast in a single piece with the other parts, or formed separately, and then connected to them, as may be thought best.

The teeth are formed upon a curve or circle, so that when the implement is forced through the mortar the mortar is forced in opposite directions, and when the implement is drawn toward the operator the mortar is forced toward the center of the hoe, owing to the shape of the teeth and the blade. The rake portion of the teeth are to be used in mixing the hair, sand, and lime together, while the other end, to which the blade is secured, is to be used in working the mortar after the different elements have been mixed together, and for the purpose of enabling the coarser and rougher portions to be broken or ground up during the working of the mortar. The teeth are made to project upon the outer side of the blade, so as to form ridges or ribs, which come in contact with rougher portions and serve to break and reduce them to powder. The blade C is to be used in the same manner as the hoe is used in mixing the mortar.

By combining the two implements together a saving of the cost of a rake is effected, and the workman can work more rapidly and to a better advantage, because he does not have to lose the time in changing from one tool to another. In using an ordinary hoe the hoe only separates the material once each time that it is forced through the mortar, but where the implement is constructed as here shown the mortar is separated or divided a number of times proportioned to the number of teeth that are used. Of course the greater number of separations that are made in the material the more quickly the mortar is in condition to be used.

Upon the outer side of this blade, at any suitable points between the ribs, there are formed suitable studs or projections, X, which form bearing-points and serve to assist in grinding and breaking the rough portions of the mortar into powder. There may be any desired number of these points.

Having thus described my invention, I claim—

1. An implement for working mortar, composed of the head A, teeth B, and blade C, having the projections X on its outer side, substantially as shown.

2. The combination of the head, the teeth, the blade, and the socket for the handle, the teeth being made to form ribs or ridges on the outer side of the blade, substantially as set forth.

In testimony whereof I affix my signature in presence of two witnesses.

W. C. NYE.

Witnesses:
F. A. LEHMANN,
L. F. GARDNER.